US009626922B2

(12) United States Patent
Huang et al.

(10) Patent No.: US 9,626,922 B2
(45) Date of Patent: Apr. 18, 2017

(54) GOA CIRCUIT, ARRAY SUBSTRATE, DISPLAY DEVICE AND DRIVING METHOD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jiacheng Huang, Beijing (CN); Jian He, Beijing (CN); Xia Feng, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/993,571

(22) Filed: Jan. 12, 2016

(65) Prior Publication Data
US 2016/0125823 A1    May 5, 2016

Related U.S. Application Data

(63) Continuation of application No. 14/366,119, filed as application No. PCT/CN2013/089480 on Dec. 16, 2013, now Pat. No. 9,269,313.

(30) Foreign Application Priority Data

Jul. 18, 2013    (CN) .......................... 2013 1 0302554

(51) Int. Cl.
G09G 3/36    (2006.01)
G02F 1/133    (2006.01)

(52) U.S. Cl.
CPC ........... *G09G 3/3614* (2013.01); *G02F 1/133* (2013.01); *G09G 3/36* (2013.01); *G09G 3/3607* (2013.01);
(Continued)

(58) Field of Classification Search
None
See application file for complete search history.

(56) References Cited

U.S. PATENT DOCUMENTS

2002/0149318 A1    10/2002    Jeon et al.
2003/0151585 A1    8/2003    Ito et al.
(Continued)

FOREIGN PATENT DOCUMENTS

CN    1526141 A    9/2004
CN    102109696 A    6/2011
(Continued)

OTHER PUBLICATIONS

International Search Report mailed May 6, 2014; PCT/CN2013/089480.
(Continued)

*Primary Examiner* — Ariel Balaoing
(74) *Attorney, Agent, or Firm* — Ladas & Parry LLP

(57) ABSTRACT

There are provided a GOA circuit, an array substrate, a display device and a driving method. The GOA circuit includes clock signal input lines and more than two GOA units connected in cascade, wherein each of the GOA units includes a selection signal output sub-unit and a selection sub-unit; the selection signal output sub-unit is configured to receive a source signal, and output a selection signal in accordance with the source signal; the selection sub-unit receives the selection signal and N clock signals, and outputs the received signal in accordance with the selection signal; and the clock signal input lines are no less than a number of
(Continued)

N, and are configured to input the clock signals to the selection sub-unit, where N is an integer number which is higher than or equal to two. The gate driving structure of the GOA circuit, the array substrate and the display device occupies a small area. The driving method can achieve a single dot polarity inversion.

2 Claims, 8 Drawing Sheets

(52) U.S. Cl.
CPC ......... *G09G 3/3659* (2013.01); *G09G 3/3677* (2013.01); *G09G 3/3696* (2013.01); *G09G 2300/0408* (2013.01); *G09G 2300/0426* (2013.01); *G09G 2300/0809* (2013.01); *G09G 2310/0205* (2013.01); *G09G 2310/0286* (2013.01); *G09G 2310/06* (2013.01); *G09G 2320/0223* (2013.01); *G09G 2320/0252* (2013.01); *G09G 2320/0673* (2013.01)

(56) References Cited

U.S. PATENT DOCUMENTS

| | | | | |
|---|---|---|---|---|
| 2009/0189838 | A1* | 7/2009 | Chen | G09G 3/3648 345/87 |
| 2010/0079363 | A1* | 4/2010 | Chung | G09G 3/3614 345/92 |
| 2010/0182305 | A1 | 7/2010 | Fang et al. | |
| 2010/0245333 | A1 | 9/2010 | Hsu et al. | |
| 2010/0315322 | A1* | 12/2010 | Cheng | G09G 3/3611 345/99 |
| 2012/0120035 | A1* | 5/2012 | Yang | G09G 3/3614 345/205 |
| 2013/0314310 | A1 | 11/2013 | Chien et al. | |
| 2014/0176410 | A1 | 6/2014 | Ma et al. | |
| 2015/0154927 | A1 | 6/2015 | Li | |

FOREIGN PATENT DOCUMENTS

| | | |
|---|---|---|
| CN | 102779474 A | 11/2012 |
| CN | 102968950 A | 3/2013 |
| CN | 103050106 A | 4/2013 |
| CN | 103390392 A | 11/2013 |
| TW | 201040912 A | 11/2010 |

OTHER PUBLICATIONS

Written Opinion of the International Searching Authority mailed May 6, 2014; PCT/CN2013/089480.

First Chinese Office Action dated Dec. 24, 2014; Appln. No. 201310302554.2.

Second Chinese Office Action dated May 18, 2015; Appln. No. 201310302554.2.

Third Chinese Office Action dated Jul. 9, 2015; Appln. No. 201310302554.2.

USPTO NOA mailed Oct. 13, 2015 in connection with U.S. Appl. No. 14/366,119.

USPTO NOA dated Nov. 12, 2015 in connection with U.S. Appl. No. 14/366,119.

* cited by examiner

GOA CIRCUIT, ARRAY SUBSTRATE, DISPLAY DEVICE AND DRIVING METHOD

TECHNICAL FIELD

The present disclosure relates to a field of display, and particularly, to a GOA circuit, an array substrate, a display device and a driving method.

BACKGROUND

GOA (Gate Driver On Array) represents gate driver on array substrate.

Current GOA circuit generally comprises several GOA units, and each of the GOA units corresponds to a gate line; particularly, an output terminal of each of the GOA units is connected to a gate line, and the output terminal of each of the GOA units is further connected to an input terminal of a subsequent GOA unit so as to turn on the subsequent GOA unit, and while an output terminal of the subsequent GOA unit is further connected to a reset signal input terminal of a previous GOA unit.

As known, one GOA unit generally comprises twelve transistors and one capacitor, and when one GOA unit correspondingly drives one gate line, the employed transistors of the GOA circuit is of a great number and the area occupied on an array substrate is large.

SUMMARY

Embodiments of the present disclosure are intended to provide a GOA circuit with a simple structure and occupying a small area of array substrate, a array substrate, a display device and a driving method.

An embodiment of the present disclosure provides a GOA circuit comprising clock signal input lines and more than two GOA units connected in cascade, wherein each of the GOA units includes a selection signal output sub-unit and a selection sub-unit; the selection signal output sub-unit is configured to receive a source signal, and output a selection signal in accordance with the source signal; the selection sub-unit receives the selection signal and N clock signals, and outputs the received signal in accordance with the selection signal; and the clock signal input lines are no less than a number of N, and are configured to input the clock signal to the selection sub-unit, where N is an integer number which is higher than or equal to two.

Further, the GOA circuit further includes a starting signal line; the selection signal output sub-unit includes a first source signal input terminal, a second source signal input terminal, a starting signal line input terminal, a first signal output terminal, a second signal output terminal and a reset signal input terminal; the first source signal input terminal is configured to input a first source signal; the second source signal input terminal is configured to input a second source signal; the first signal output terminal is connected to the selection sub-unit, and is configured to output the selection signal generated in accordance with the first source signal and the second source signal; the starting signal line input terminal of the selection signal output sub-unit of a first GOA unit is connected to the starting signal line, and is configured to receive the starting signal line; a reset signal input terminal of the selection signal output sub-unit of the first GOA unit is connected to the first signal output terminal of the selection signal output sub-unit of a second GOA unit, and receives the selection signal outputted from the first signal output terminal of the selection signal output sub-unit of the second GOA unit;

the starting signal line input terminal of the selection signal output sub-unit of an $m^{th}$ GOA unit is connected to the second signal output terminal of the selection signal output sub-unit of a $(m-1)^{th}$ GOA unit, and receives the selection signal of the second signal output terminal of the selection signal output sub-unit of the $(m-1)^{th}$ GOA unit; the reset signal input terminal of the selection signal output sub-unit of an $m^{th}$ GOA unit is connected to the first signal output terminal of the selection signal output sub-unit of a $(m+1)^{th}$ GOA unit, and receives the selection signal outputted from the first signal output terminal of the selection signal output sub-unit of the $(m+1)^{th}$ GOA unit; and the starting signal line input terminal of the selection signal output sub-unit of an $M^{th}$ GOA unit is connected to the second signal output terminal of the selection signal output sub-unit of a $(M-1)^{th}$ GOA unit, and receives the selection signal of the second signal output terminal of the $(M-1)^{th}$ GOA unit; the reset signal input terminal of the selection signal output sub-unit of the $M^{th}$ GOA unit is connected to the starting signal line, where m is a natural number and M>m>1, and the M is the amount of the GOA units.

Optionally, the selection sub-unit includes N clock signal input terminals, a selection signal input terminal and N clock signal output terminals; the N clock signal input terminals are respectively connected to then N clock signal input lines, and are configured to input the clock signals; the selection signal input terminal is configured to receive the selection signal outputted from the selection signal output sub-unit; and the clock signal output terminal outputs the received the clock signal in accordance with the selection signal.

Optionally, the value of N is equal to 4; the GOA unit further includes a gate line turn-on voltage line and a gate line turn-off voltage line;

the selection sub-unit includes a pull up module, a maintaining module, a gate line turn-on voltage line voltage input terminal connected to the gate line turn-on voltage line voltage line and a gate line turn-off voltage input terminal connected to the gate line turn-off voltage line;

the pull up module includes a first transistor, a second transistor, a third transistor and a fourth transistor; each of the gates of the first transistor, the second transistor, the third transistor and the fourth transistor is connected to the selection signal input terminal; the drain of the first transistor is connected to a first clock signal input terminal, and the source thereof is connected to a first clock signal output terminal, for externally outputting a first clock signal; the drain of the second transistor is connected to a second clock signal input terminal, and the source thereof is connected to a second clock signal output terminal, for externally outputting a second clock signal; the drain of the third transistor is connected to a third clock signal input terminal, and the source thereof is connected to a third clock signal output terminal, for externally outputting a third clock signal; the drain of the fourth transistor is connected to a fourth clock signal input terminal, and the source thereof is connected to a fourth clock signal output terminal, for externally outputting a fourth clock signal;

the maintaining module includes a fifth transistor, a sixth transistor, a seventh transistor, an eighth transistor, a ninth transistor and a tenth transistor; the gate and the drain of fifth transistor is connected to the gate line turn-on voltage line voltage input terminal, and the source thereof is connected to the drain of the sixth transistor; the gate of the sixth transistor is connected to the selection signal input terminal, and the source thereof is connected to the gate line signal turn-off voltage line; each of the gates of the seventh transistor, the eighth transistor, the ninth transistor and the tenth transistor is connected to the source of fifth transistor; the drain of the seventh transistor is connected to the source of the first transistor, the source of the seventh transistor is connected to the gate line turn-off voltage input terminal; the drain of the eighth transistor is connected to the source of the second transistor, the source of the eighth transistor is connected to the gate line turn-off voltage input terminal; the drain of the ninth transistor is connected to the source of the third transistor, the source of the ninth transistor is connected to the gate line turn-off voltage input terminal; and the drain of the tenth transistor is connected to the source of the fourth transistor, and the source of the tenth transistor is connected to the gate line turn-off voltage input terminal.

An embodiment of the present disclosure provides an array substrate comprising the above GOA circuit and several gate lines; each of the selection sub-units is connected to N gate lines arranged successively; wherein, a product of the N and the total number M of the GOA units in the GOA circuit is equal to the total amount of the gate lines.

An embodiment of the present disclosure provides a display device comprising the above array substrate.

Optionally, the array substrate further includes a pixel matrix, gate lines and data lines; each row of the pixels corresponds to two gate lines of a first gate line and a second gate line; pixels on odd columns is connected to the first gate line, a pixels on even columns is connected to second gate line; pixels on (2i+1) column and pixels on 2(i+1) column share one data line, where i is a natural number; the display device is a liquid crystal display device.

Optionally, the array substrate further comprises a pixel matrix, gate lines and data lines; each row of pixels is connected to a gate line; each column of pixels is connected to one data line; and the display device is a liquid crystal display device.

An embodiment of the present disclosure further provides a driving method for a display device, and the method applies to the above display device, in the method, each image frame is divided to N fields for display; each of the GOA units turns on one gate line through the clock signal during each field period; each of the GOA units sequentially turns on the gate line connected thereto; polarities of voltages outputted from all of the data lines are identical during each field period; polarities of voltages outputted from data lines are opposite during a $(4S+1)^{th}$ and a $(4S+2)^{th}$ fields; polarities of voltages outputted from data lines are identical during a $(4S+2)^{th}$ and a $(4S+3)^{th}$ fields; polarities of voltages outputted from data lines during a $(4S+3)^{th}$ and a $(4S+4)^{th}$ fields are opposite; wherein, S is a natural number, and value of (4S+4) is less than or equal to N; and N represents the number of the clock signals outputted from each of the GOA units, and is a multiple of 4.

An embodiment of the present disclosure further provides a driving method for a display device, and the method applies to the above display device, in the method, each image frame is divided to N fields for display; each of the GOA units turns on one gate line through the clock signal in each field period; each of the GOA units sequentially turns on the gate line connected thereto; and polarity inversion period of voltage outputted from each of data lines is equal to a field period, and polarities of voltages outputted from two adjacent data lines are always opposite each other; wherein N represents the number of the clock signals outputted from each of the GOA units.

The GOA circuit, the array substrate, the display device and the driving method according to the embodiments of the present disclosure employ a structure of the selection signal output sub-unit and the selection sub-unit which can be connected to N gate lines, and thus (N−1) GOA units can be omitted; and as compared with N GOA units, the structure of the selection signal output sub-unit and the selection sub-unit reduces the number of the adopted electronic elements such as transistors, and hence the occupied area of the array substrate is reduced.

DETAILED DESCRIPTION

Figure 1:
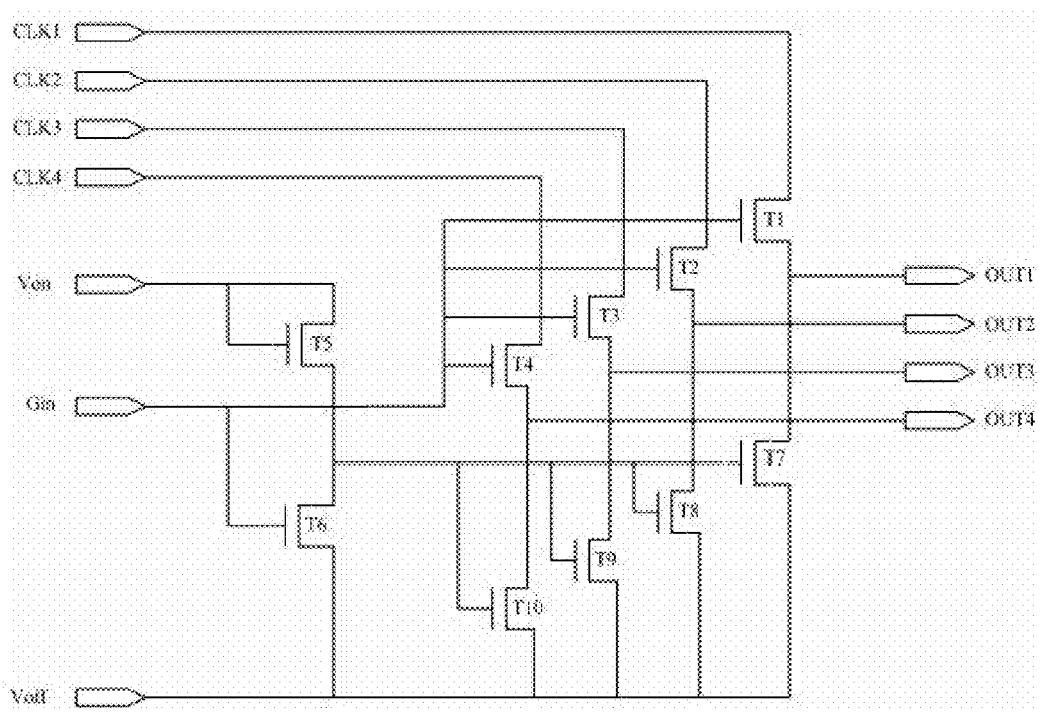
FIG. 1 is a diagram of structure of a selection sub-unit according to a third embodiment of the present disclosure.

Embodiments of the present disclosure will be further illustrated with reference to drawings and detailed descriptions of the specification.

First Embodiment

A GOA circuit of the present disclosure comprises clock signal input lines and more than two GOA units (not illustrated) connected in cascade, wherein each of the GOA units includes a selection signal output sub-unit and a selection sub-unit; the selection signal output sub-unit is configured to receive a source signal, and output a selection signal in accordance with the source signal; the selection sub-unit receives the selection signal and a plurality of N clock signals, and outputs the received clock signal in accordance with the selection signal; and the clock signal input lines are no less than N, and are configured to input the clock signal to the selection sub-unit.

The internal structure of the selection signal output sub-unit can employ a currently used GOA unit which is formed by twelve transistors and one capacitor in connection, or employ a SRC cascade register formed by thin film transistors.

The selection sub-unit receives N clock signals to determine whether to output a clock signal under control of the selection signal, and these clock signals are inputted to the gate lines of the array substrate where the GOA circuit is located; each of the gate lines turn on or turn off the switch (usually, a thin film transistor) of a pixel electrode of a pixel connected thereto.

The value of N can be determined from parameters such as size of the array substrate, and the specific value thereof is an integer number which is equal to or more than two, such as three, four, six and the like. The larger the value of N is, the more the gate lines connected to a GOA unit will be.

The GOA unit of the present disclosure firstly modifies a conventional connection configuration in which a GOA unit driver corresponds to a gate line, employs a cascade structure of the selection signal output sub-unit and the selection sub-unit to implement the driving of a GOA unit for N gate lines; as compared with a combination of N GOA units, the structure is simplified and the number of the employed elements is correspondingly reduced; therefore, the occupied area on the array substrate is also reduced, and thus it is advantageous in terms of the simplification and miniaturization of the array substrate.

Second Embodiment

On the basis of the previous embodiment, the present embodiment provides a GOA circuit. The GOA circuit further comprises a starting signal line, wherein the structure (not illustrated) of the selection signal output sub-unit is as follows.

The selection signal output sub-unit includes a first source signal input terminal, a second source signal input terminal, a starting signal line input terminal, a first signal output terminal, a second signal output terminal and a reset signal input terminal.

The first source signal input terminal is configured to input a first source signal;

the second source signal input terminal is configured to input a second source signal;

the first signal output terminal is connected to the selection sub-unit, and is configured to output a selection signal generated in accordance with the first source signal and the second source signal;

the starting signal line input terminal of the selection signal output sub-unit of a first GOA unit is connected to the starting signal line, and is configured to receive the starting signal line; a reset signal input terminal of the selection signal output sub-unit of the first GOA unit is connected to a first signal output terminal of the selection signal output sub-unit of a second GOA unit, and receives the selection signal outputted from the first signal output terminal of the selection signal output sub-unit of the second GOA unit;

the starting signal line input terminal of the selection signal output sub-unit of an $m^{th}$ GOA unit is connected to the second signal output terminal of the selection signal output sub-unit of a $(m-1)^{th}$ GOA unit, and receives the selection signal of the second signal output terminal of the selection signal output sub-unit of the $(m-1)^{th}$ GOA unit; the reset signal input terminal of the selection signal output sub-unit of an $m^{th}$ GOA unit is connected to the first signal output terminal of the selection signal output sub-unit of a $(m+1)^{th}$ GOA unit, and receives the selection signal outputted from the first signal output terminal of the selection signal output sub-unit of the $(m+1)^{th}$ GOA unit; and the starting signal line input terminal of the selection signal output sub-unit of an $M^{th}$ GOA unit is connected to the second signal output terminal of the selection signal output sub-unit of a $(M-1)^{th}$ GOA unit, and receives the selection signal of the second signal output terminal of the selection signal output sub-unit of the $(M-1)^{th}$ GOA unit; the reset signal input terminal of the selection signal output sub-unit of the $M^{th}$ GOA unit is connected to the starting signal line, where m is a natural number and M>m>1, and the M is the number of the GOA units.

The second signal output terminal of the selection signal output sub-unit of the previous GOA unit is connected to the starting signal line input terminal of the subsequent GOA unit, allows the generated selection signal to also act as the starting signal line of the subsequent GOA unit so as to trigger operation of the subsequent GOA unit and realize the scanning of the gate lines, and the structure is simple and ingenious; meanwhile, the selection signal generated by the subsequent GOA unit acting as the reset signal of the previous GOA unit allows the selection sub-unit of the previous GOA unit to be recovered to the original state so as to facilitate a next scanning, which also realizes the multiplexing of the signals; hence, the circuit for generating and outputting different signals is reduced and the circuit structure is further simplified, and a simple structure and a small occupied area are realized.

Third Embodiment

On the basis of the first embodiment and the second embodiment, the present disclosure provides another structure of the selection sub-unit, and the details thereof are as follows.

The selection sub-unit includes N clock signal input terminals, a selection signal input terminal and N clock signal output terminals;

N clock signal input terminals are respectively connected to N clock signal input lines, and are configured to input the clock signals;

the selection signal input terminal is configured to receive the selection signal outputted from the selection signal output sub-unit;

the clock signal output terminal outputs the received the clock signal in accordance with the selection signal.

As shown in FIG. 1, the present embodiment is further concreted as follows. The value of N is equal to 4; the GOA unit further includes a gate line turn-on voltage line voltage line and a gate line turn-off voltage line; the gate line turn-on voltage line voltage Von is always at a high level, and the gate line turn-off voltage Voff is always at a low level;

the selection sub-unit includes a pull up module, a maintaining module, a gate line turn-on voltage line voltage input terminal connected to the gate line turn-on voltage line voltage line and a gate line turn-off voltage input terminal connected to the gate line turn-off voltage line;

the pull up module includes a first transistor T1, a second transistor T2, a third transistor T3 and a fourth transistor T4;

each of the gates of the first transistor T1, the second transistor T2, the third transistor T3 and the fourth transistor T4 is connected to the selection signal input terminal Gin;

the drain of the first transistor T1 is connected to a first clock signal input terminal CLK1, the source thereof is configured to externally output a first clock signal; the output terminal for outputting the first clock signal is a terminal of OUT1;

the drain of the second transistor T2 is connected to a second clock signal input terminal CLK2, and the source thereof is configured to externally output a second clock signal; the output terminal for outputting the second clock signal is a terminal of OUT2;

the drain of the third transistor T3 is connected to a third clock signal input terminal CLK3, and the source thereof is configured to externally output a third clock signal; the output terminal for outputting the third clock signal is a terminal of OUT3;

the drain of the fourth transistor T4 is connected to a fourth clock signal input terminal CLK4, and the source thereof is configured to externally output a fourth clock signal; the output terminal for outputting the fourth clock signal is a terminal of OUT4;

the maintaining module includes a fifth transistor T5, a sixth transistor T6, a seventh transistor T7, an eighth transistor T8, a ninth transistor T9 and a tenth transistor T10;

the gate and the drain of fifth transistor T5 are connected to the gate line signal turn-on voltage line, and the source thereof is connected to the drain of the sixth transistor T6;

the gate of the sixth transistor T6 is connected to the selection signal input terminal, and the source thereof is connected to the gate line turn-off voltage input terminal;

each of the gates of the seventh transistor T7, the eighth transistor T8, the ninth transistor T9 and the tenth transistor T10 is connected to the source of fifth transistor T5; the Von voltage is a high level and the Voff is a low level, the gate-source voltage of the transistor T5 is higher than the threshold voltage, and transistor T5 is turned on and the high level is outputted;

the drain of the seventh transistor T7 is connected to the source of the first transistor T1, the source of the seventh transistor T7 is connected to the gate line turn-off voltage input terminal;

the drain of the eighth transistor T8 is connected to the source of the second transistor T2, the source of the eighth transistor T8 is connected to the gate line turn-off voltage input terminal;

the drain of the ninth transistor T9 is connected to the source of the third transistor T3, the source of the ninth transistor T9 is connected to the gate line turn-off voltage input terminal; and the drain of the tenth transistor T10 is connected to the source of the fourth transistor T4, and the source of the tenth transistor T10 is connected to the gate line turn-off voltage input terminal.

When each of the first clock signal, the second clock signal, the third clock signal and the fourth clock signal is at the high level, the corresponding gate line on the array substrate arranged with the GOA circuit of the present embodiment is turned on, and when each of the first clock signal, the second clock signal, the third clock signal and the fourth clock signal is at the low level, the corresponding gate line is turned off; in order to realize a progressive scanning of the gate lines, it can be realized by staggering the high levels of different clock signals by setting.

With reasonable design of the size ratios of the fifth transistor and sixth transistor to allow the selection signal inputted from selection signal input terminal Gin to be at the high level, the node where the source of the fifth transistor and the drain of the sixth transistor are connected is pulled down, so that the transistors T7~T10 are turned off. In this way, when the selection signal inputted from the Gin is at the high level, all of the transistors T1 to T4 are turned on and externally output the clock signals CLK1 to CLK4. When the selection signal input from the Gin is at the low level, all of the transistors T1 to T4 are turned off, and the clock signals CLK1 to CLK4 can not be outputted through the signal output terminals OUT1 to OUT4; in this case, transistors T7 to T10 are turned on and output voltages of OUT1 to OUT4 are pulled down so as to maintain a low voltage.

In the present disclosure, there is provided a selection sub-unit which can be connected to four gate lines simultaneously, and thus with respect to the array substrate with this GOA circuit, the number of the GOA units is only one fourth as compared with the original, and the number of the employed transistors is less than half of the original transistors.

In the present disclosure, it can be considered that a selection sub-unit comprising ten transistors is added to the original GOA unit, and thus driving of four gate lines is realized; as compared with a conventional single end in which four GOA units drive four gate lines, the number of the transistors is reduced by 26, and thus the structure is more simple and the occupied area of the array substrate is also reduced.

Fourth Embodiment

Figure 2:
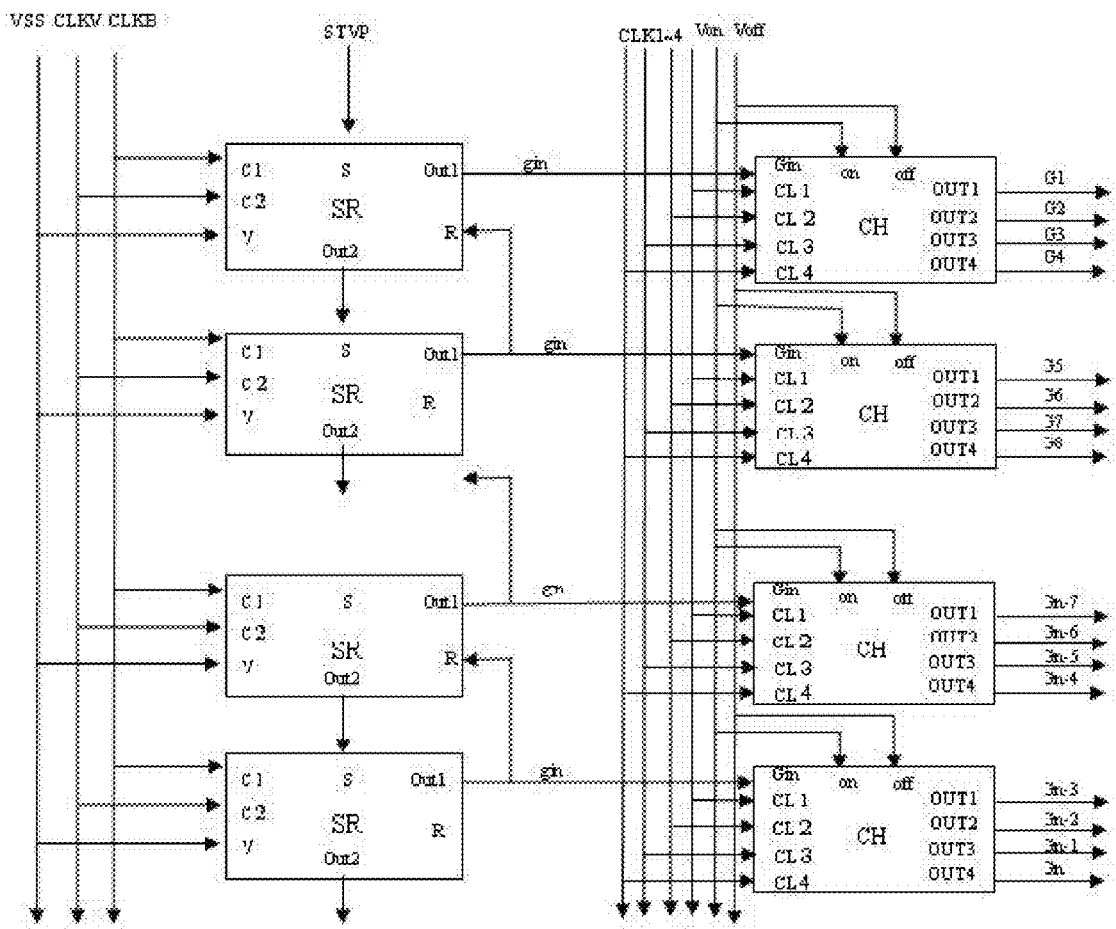
FIG. 2 is a diagram of structure of a GOA circuit according to a fourth embodiment of the present disclosure.

As shown in FIG. 2, in the present disclosure, in connection with the selection signal output sub-unit and the selection sub-unit according to the above embodiments, there is provided a GOA circuit; the GOA circuit of this embodiment comprises clock signal input lines and more than two GOA units connected in cascade; each of the GOA units includes a selection signal output sub-unit SR and a selection sub-unit CH; the selection signal output sub-unit SR is configured to receive a source signal, and outputs a selection signal gin in accordance with the source signal; the selection sub-unit CH receives the selection signal gin and N clock signals, and outputs the received clock signal in accordance with the selection signal.

the number of the clock signal input lines is at least 4, and the clock signal input lines are configured to input the clock signals to the selection sub-unit CH.

For example, the GOA circuit further comprises a starting signal line STVP, wherein structure of the selection signal output sub-unit SR is as follows.

The selection signal output sub-unit SR comprises a first source signal input terminal C1, a second source signal input terminal C2, a starting signal line input terminal s, a first signal output terminal Out1, a second signal output terminal Out2 and a reset signal input terminal R; the first source signal input terminal C1 is configured to input a first source signal CLKB; the second source signal input terminal C2 is configured to input a second source signal CLKV; the first signal output terminal Out1 is connected to the selection sub-unit CH for outputting a selection signal gin generated from the first source signal CLKV and the second source signal CLKB;

a starting signal line input terminal s of the selection signal output sub-unit SR of a first GOA unit is connected to the starting signal line, for receiving the starting signal line STVP; the reset signal input terminal R of the selection signal output sub-unit SR of the first GOA unit is connected to the first signal output terminal Out1 of the selection signal output sub-unit SR of a second GOA unit, for receiving the selection signal gin outputted from the first signal output terminal Out1 of the selection signal output sub-unit SR of the second GOA unit;

the starting signal line input terminal s of the selection signal output sub-unit SR of the m$^{th}$ GOA unit is connected to a second signal output terminal Out2 of the (m−1)$^{th}$ GOA unit, for receiving the selection signal gin of the second signal output terminal Out1 of the selection signal output sub-unit SR of the (m−1)$^{th}$ GOA unit; the reset signal input terminal R of the selection signal output sub-unit SR of the m$^{th}$ GOA unit is connected to first signal output terminal Out1 of the selection signal output sub-unit SR of the (m+1)$^{th}$ GOA unit, for receiving the selection signal gin outputted from the first signal output terminal Out1 of the selection signal output sub-unit SR of the (m+1)$^{th}$ GOA unit;

the starting signal line input terminal s of the selection signal output sub-unit SR of the M$^{th}$ GOA unit is connected to the second signal output terminal Out2 of the selection signal output sub-unit SR of the (M−1)$^{th}$ GOA unit, for receiving selection signal gin of the second signal output terminal Out2 of the selection signal output sub-unit SR of the (M−1)$^{th}$ GOA unit; the reset signal input terminal R of the selection signal output sub-unit SR of the M$^{th}$ GOA unit is connected to the starting signal line so as to receive the starting signal line STVP from the starting signal line, where m is a natural number and M>m>1, and the M is number of the GOA units.

In a specific implementation, the first source signal and the second source signal are also the clock signals, and when the enable signal VSS of the GOA unit is at the high level, the selection signal of this embodiment is outputted through the processing by a logic circuit, and is inputted to the selection sub-unit connected thereto.

The structure of the selection sub-unit CH is for example as follows.

The selection sub-unit comprises four clock signal input terminals, a selection signal input terminal Gin, and four clock signal output terminals of OUT1, OUT2, OUT3 and OUT4.

The four clock signal input terminals are respectively connected to four clock signal input lines for inputting clock signals CLK1 to CLK4; the selection signal input terminal Gin is configured to receive the selection signal gin outputted from the selection signal output sub-unit SR; the clock signal output terminals output the received clock signals according to the selection signal.

The details are as show in FIG. 2. The clock signal output terminals OUT1, OUT2, OUT3 and OUT4 of the selection sub-unit CH of a first GOA unit are sequentially connected to the gate lines G1, G2, G3 and G4 on the array substrate; the clock signal output terminals OUT1, OUT2, OUT3 and OUT4 of the selection sub-unit CH of the second GOA unit are sequentially connected to the gate lines G5, G6, G7 and G8 on the array substrate; the output terminals OUT1, OUT2, OUT3 and OUT4 of the selection sub-unit CH of the (n/4−1)$^{th}$ GOA unit are sequentially connected to the gate lines Gn-7, Gn-6, Gn-5 and Gn-4 on the array substrate; the output terminals OUT1, OUT2, OUT3 and OUT4 of the selection sub-unit CH of the (n/4)$^{th}$ GOA unit are sequentially connected to the gate lines Gn-3, Gn-2, Gn-1 and Gn on the array substrate;

herein, the value of n is an integer which is no higher than the total number of the gate lines on the array substrate. The gate line turn-on voltage line voltage Von is connected to the input terminal On of the selection sub-unit of each of the GOA units, and the gate line turn-off voltage line Voff is connected to the input terminal Off of the selection sub-unit of each of the GOA units. In normal case, the gate line turn-on voltage line voltage Von is always at the high level and the gate line turn-off voltage Voff is always at the low level.

As can be known from FIG. 2 that, with respect to the GOA circuit of this embodiment, each of the GOA units has four clock signal output terminals which can be used to turn on four gate lines on the array substrate; as compared with a conventional structure in which the one GOA unit drives one gate line, it enjoys advantages of ingenious structure, small number of the employed transistors and small occupied areas.

Fifth Embodiment

The array substrate of the present embodiment comprises the GOA circuit according to any of the first to fourth embodiments and several gate lines; each of the selection sub-units is respectively connected to N gate lines successively arranged; a clock signal of the selection sub-unit of one GOA unit is correspondingly inputted to one gate line; wherein product of the N and the total number M of the GOA units of the GOA circuit is equal to the total amount of the gate lines.

In a conventional array substrate, with respect to the array substrate, the GOA units are scanned from top to bottom or from bottom to top one by one, so as to realize progressive gate lines scanning; and in the array substrate of this embodiment, since one GOA unit drives at least two (N) gate lines, the number of the GOA units is reduced by (N−1)/N; the driving circuit is simplified, the area occupied by the driving circuit is reduced, and the area of the driving circuit integrated on the array substrate is allowed to be decreased, which can facilitate the miniaturization of the display device with this array substrate.

Sixth Embodiment

The display device of this embodiment comprises the array substrate of the fifth embodiment. Since the display device of this embodiment employs the array substrate comprising the GOA circuit of the embodiment of the present disclosure, it also enjoys characteristics of simple and ingenious structure of the gate driving circuit, the area of the array substrate occupied by the GOA circuit is small, and it facilitates the miniaturization of display device. The display device can comprise display means including the array substrate, and can be an OLED display device or a liquid crystal display device.

Seventh Embodiment

The display device according to this embodiment comprises an array substrate of the embodiments of the present disclosure, and the array substrate further comprises a pixel matrix, gate lines and data lines; each row of the pixels corresponds to two gate lines, that is, a first gate line and a second gate line; pixels on odd columns are connected to the first gate line, and pixels on even columns are connected to the second gate line; a $(2i+1)^{th}$ column of pixels and a $2(i+1)^{th}$ column of pixels share one data line, where i represents a natural number; the display device is a liquid crystal display device.

The liquid crystal display device generally comprises an array substrate and a color film substrate arranged opposite each other with a liquid crystal molecular layer therebetween.

Figure 3:
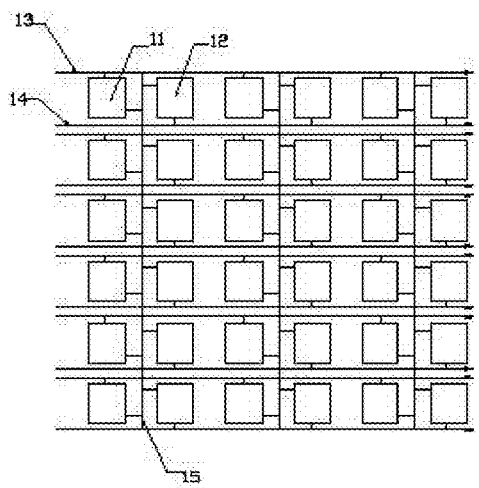
FIG. 3 is a diagram of a partial structure of an array substrate according to a seventh embodiment of the present disclosure.

For example, as shown in FIG. 3, pixel 11 and pixel 12 are pixels on the same row; the pixel 11 is connected to the gate line 13, and the pixel 12 is connected to the gate line 14; that is, using different gate lines to drive adjacent pixels on a same row is realized; the pixel 11 and pixel 12 on different columns are connected to the same data line 15; in a specific implementation, the signal inputted through data line is input through a data line driving IC connected to the data line; in a practical manufacture, the cost of the data line driving IC is much higher than that of the gate line driving IC; therefore, in this embodiment, the number of the gate lines is to be doubled and the number of the data lines is to be halved; the application of data line driving IC, the price cost of which is high, is reduced, while independent driving for each of the pixels is achieved, and thus the overall cost of the display device is reduced.

In a conventional display device employing dual gates driving, since a row of pixels is driven by two gate lines, the GOA unit is also doubled, which directly causes the area of the array substrate as a non-display region to be increased and causes frame of the display device to be increased, and thus it is disadvantageous in narrowing frames of the display device and minimizing the display device; and in this embodiment, since the GOA unit can drive N gate lines simultaneously and N is an integer higher than or equal to two, a possibility is provided for ensuring the non-display region area of array substrate and display device with the dual gate driving to be unchanged or reduced as compared with that of a conventional display device with single gate driving, and thus it is advantageous in minimizing the display device and narrowing the frames.

Eighth Embodiment

The display device according to this embodiment comprises the array substrate of the embodiments of the present disclosure; on the array substrate, there is arranged the GOA circuit of the embodiments of the disclosure; in addition, the array substrate further includes a pixel matrix, gate lines and data lines; each row of pixels is connected to one gate line; each column of pixels is connected to one data line; the display device is a liquid crystal display device.

In this embodiment, the number of the gate lines is identical to the number of rows of pixels in the pixel matrix, and the number of the data lines is identical to the number of columns of pixels in the pixel matrix. Further, the display device of this embodiment is a liquid crystal display.

The liquid crystal display device generally comprises an array substrate, an opposite substrate arranged to be opposite the array substrate, and a liquid crystal layer located between the array substrate and the opposite substrate; the opposite substrate is generally a color film substrate, and in a practical application, a color filter on the color film substrate can be arranged on the array substrate; in this case, the substrate opposite the array substrate can be simply a transparent substrate.

For example, on the array substrate, there are arranged pixel electrodes and thin film transistor TFTs. The drain of each thin film transistor is connected to a pixel electrode, the gate of each thin film transistor is connected to a gate line, and the source of each thin film transistor is connected to a data line; the gate line is connected to one clock signal output terminal of the GOA circuit; the gate line and the data line are arranged to be vertical with each other, so that the whole substrate is divided into a plurality of independent pixel spaces and a pixel electrode is positioned in a pixel space. The liquid crystal layer presents a different optical rotation property depending on the driving voltage of the pixel electrode, so as to achieve different grey level presentation; optical filtering is achieved through a color resist layer on the color film substrate so as to present different colors (such as three primary colors formed by R/G/B color resist layers), and the display of the image is achieved through light mixing phenomenon of light rays with different colors. In a practical application, the color of the color resist layer can also be other colors such as yellow or the like.

In connection with the sixth to the seventh embodiments, due to the usage of the GOA circuit of the embodiments of the present disclosure, as compared with the display device using the conventional GOA circuit, the display device of the embodiments of the present disclosure enjoys a plurality of advantages such as ingenious structure of gate driving circuit, small occupied areas and the like.

Ninth Embodiment

There are many manners for the polarity inversion driving method, including frame polarity inversion driving, row or column polarity inversion driving and single dot polarity inversion driving; the reason for performing inversion driving is to avoid the decrease of display effect and display performance resulted from the characteristic of the liquid crystal molecular being destroyed when electric field of two ends of the liquid crystal layer remains unchanged for a long time; in a practical application, the effect of the single dot polarity inversion is the best, but the power consumption thereof is relatively large.

Here, with respect to the frame polarity inversion driving and the row or column polarity inversion driving, the period of polarity inversion of the output voltage in the data lines is equal to frame period; however, the improvement on display effect of the display device is relatively low; the single dot polarity inversion is one in which in a same frame, the voltage polarity of the pixels surrounding each of the pixels is opposite to the voltage polarity of the surrounded pixels at the same time; therefore, at the time of turning on a gate line when the pixel is refreshed, the voltage polarity inversion will be performed on the data line once, the inversion period is l/P of a frame period, where P is the total number of the gate lines; the high polarity inversion frequency of the output voltage of the data line is the most significant factor that causes a high driving consumption in the single dot polarity inversion driving method.

To sum up, with respect to the fame polarity inversion driving and the row polarity inversion driving, the period of the polarity inversion of the voltage of the data line is low, and the power consumption is relatively small; however, the improvement on the display effect is relatively poor, and it is easy for image flicker to occur; the single dot polarity inversion driving is favorable in the improvement on the display effect; however, the polarity inversion period of the data line is small, which causes a large power consumption.

First of all, on the basis of the GOA circuit provided by the embodiment of the present disclosure, this embodiment provides a display device driving method different from the previous polarity inversion driving, and can realize single dot polarity inversion;

secondly, the driving method of the display device of this embodiment can perfectly solve the above contradiction, and can effectively mediate the contradiction between the display effect improvement and the power consumption; for example, the driving method of the display device of this embodiment can be applied to the display device of the seventh embodiment, and comprises the following.

Each image frame is divided to N fields for display; each of the GOA units turns on one gate line through the clock signal during each field period; each of the GOA units sequentially turns on the gate line connected thereto; for example, the GOA unit turns on the first gate line connected thereto through the clock signal in the first field, and the GOA unit turns on the second gate line connected thereto through the clock signal in the second field. Polarities of voltages outputted from all of the data lines are identical during each field period; polarities of voltages outputted from data lines are opposite during a $(4S+1)^{th}$ and a $(4S+2)^{th}$ fields; polarities of voltages outputted from data lines are identical during a $(4S+2)^{th}$ and a $(4S+3)^{th}$ fields; polarities of voltages outputted from data lines at a $(4S+3)^{th}$ and a $(4S+4)^{th}$ fields are opposite; wherein S is a natural number, and value of $(4S+4)$ is less than or equal to N; and N represents the number of the clock signals outputted from each of the GOA units, and is a multiple of 4.

In order to achieve pixel refreshment, whenever a gate line is turned on, all of the data lines have to input signals once; in this embodiment, data lines perform scanning M times in each field; in this embodiment, it can be known that, the period of the polarity inversion of the output voltage of the data lines is no less than the field period, that is, 1/N of frame period. Therefore, as compared with the display device of the conventional technology having a same number of the gate lines as that of the display device of the present embodiment, the voltage polarity inversion period of the data lines of the present embodiment is at least M times of the output voltage polarity inversion period of the data lines of the conventional single dot polarity inversion, the inversion period is greatly increased, so that it is advantageous to decrease the power consumption; therefore, the driving method for the display device of the present embodiment can be perfectly mediate the contradiction between the display effect and the driving power consumption of the current polarity inversion driving method.

The following is an example of the single dot inversion driving method of the display device based on the present embodiment.

The array substrate includes thereon the GOA circuit of the embodiments of the present disclosure, and each of the GOA units of the GOA circuit is connected to four gate lines.

Figure 4:
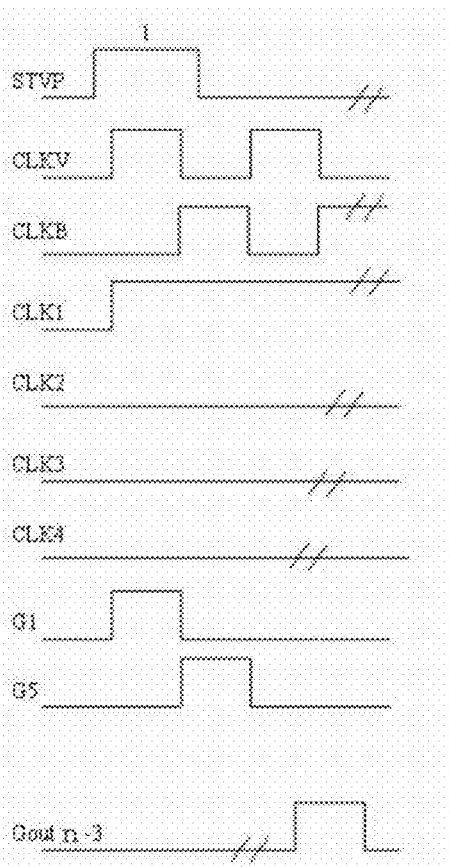
FIG. 4 is a timing chart of respective signals of a first field of a polarity inversion driving method according to an embodiment of the present disclosure.

During a first ¼ frame period, that is, a first field, the STVP signal is represented with 1 of FIG. 4, and correspondingly, a first source signal is denoted with CLKV; a second source signal is denoted with CLKB; a first clock signal is denoted with CLK1; a second clock signal is denoted with CLK2; a third clock signal is denoted with CLK3; a fourth clock signal is denoted with CLK4; and gate lines that are sequentially turned on are denoted with G1, G5 ... Gn-3 respectively, where n is the number of the gate lines; turn-on timing chart of the turn-on gate lines is as shown in the drawing; in this case, only the first clock signal CLK1 in each of the GOA units is at the high level, that is, the gate lines G1, G5 ... Gn-3 corresponding to the first clock signal are turned on.

Figure 8:
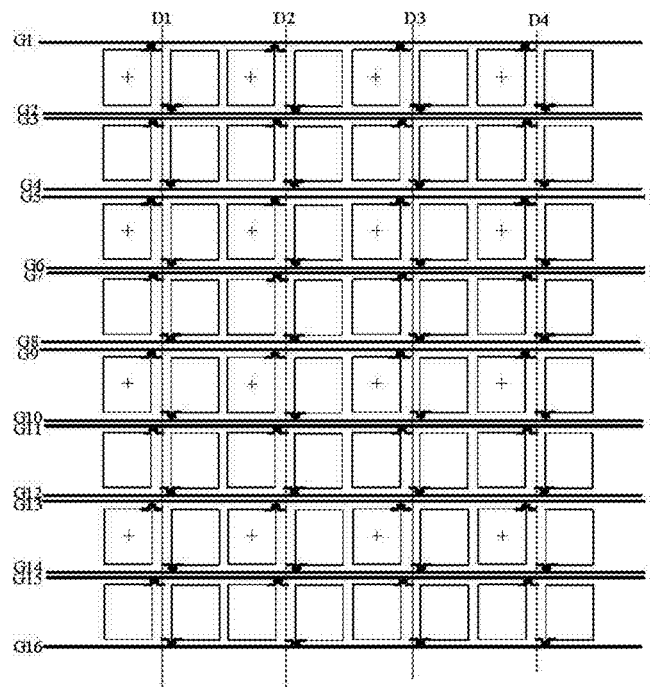
FIG. 8 is a diagram of a part of pixel polarities at the time of driving a display device according to the seventh embodiment in accordance with the driving method of a ninth embodiment of the present disclosure under the timing shown in FIG. 4.

Also as shown in FIG. 8, after the gate lines corresponding to the first clock signal of each of the GOA units are turned on, the voltage polarities of the pixels which are on an odd column and on an odd row are positive (in the drawing, denoted with a symbol of "+"), and in this field, polarities of the voltages outputted from all of the data lines are positive.

Figure 5:
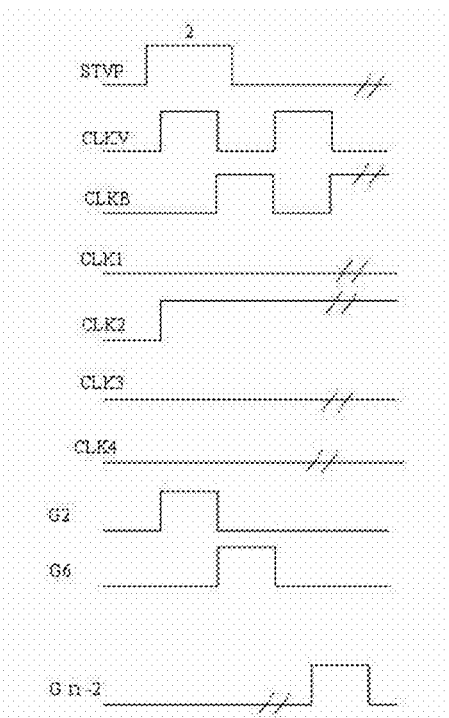
FIG. 5 is a timing chart of respective signals of a second field of the polarity inversion driving method according to the embodiment of the present disclosure.

During a second ¼ frame period, that is, a second field, the STVP signal is represented with 2 of FIG. 5, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G2, G6 ... Gn-2 respectively, where n is the number of the gate lines; turn-on timing chart of the turn-on gate lines is as shown in the drawing; in this case, only the second clock signal CLK2 in each of the GOA units is at the high level, that is, the gate lines G2, G6 ... Gn-2 corresponding to the second clock signal are turned on.

Figure 9:
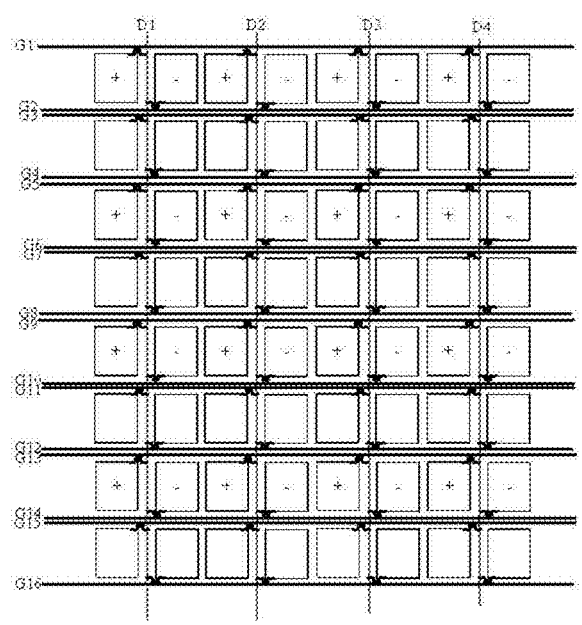
FIG. 9 is a diagram of a part of pixel polarities at the time of driving the display device according to the seventh embodiment in accordance with the driving method of the ninth embodiment of the present disclosure under the timing shown in FIG. 5.

Also as shown in FIG. 9, after the gate lines corresponding to the second clock signal of each of the GOA units are turned on, the voltage polarities of the pixels which are on an even column and on an odd row are negative (in the drawing, denoted with a symbol of "−"), and in this field, polarities of the voltages outputted from all of the data lines are negative.

It can be known from above that, during the first and the second fields, voltages outputted from the data lines are changed once; in this case, the inversion period of the polarity of the voltage outputted from the data lines is the field period, that is, (1/N) frame period.

Figure 6:
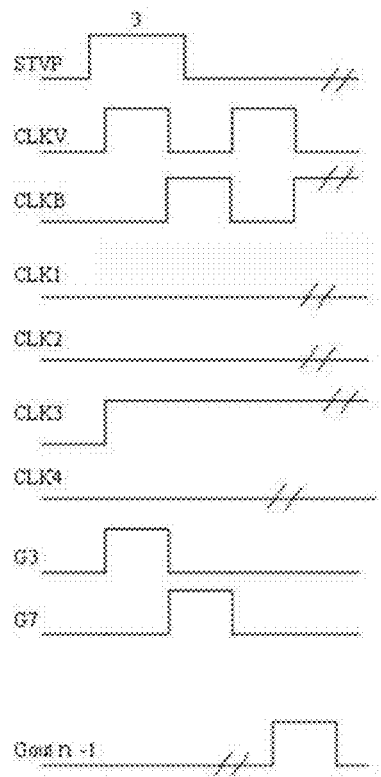
FIG. 6 is a timing chart of respective signals of a third field of the polarity inversion driving method according to the embodiment of the present disclosure.

During a third ¼ frame period, that is, a third field, the STVP signal is represented with 3 of FIG. 6, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G3, G7 ... Gn-1 respectively, where n is the number of the gate lines; turn-on timing chart of the turn-on gate lines is as shown in the drawing; in this case, only the third clock signal CLK3 in each of the GOA units is at the high level, that is, the gate lines G3, G7 ... Gn-1 corresponding to the third clock signal are turned on.

Figure 10:
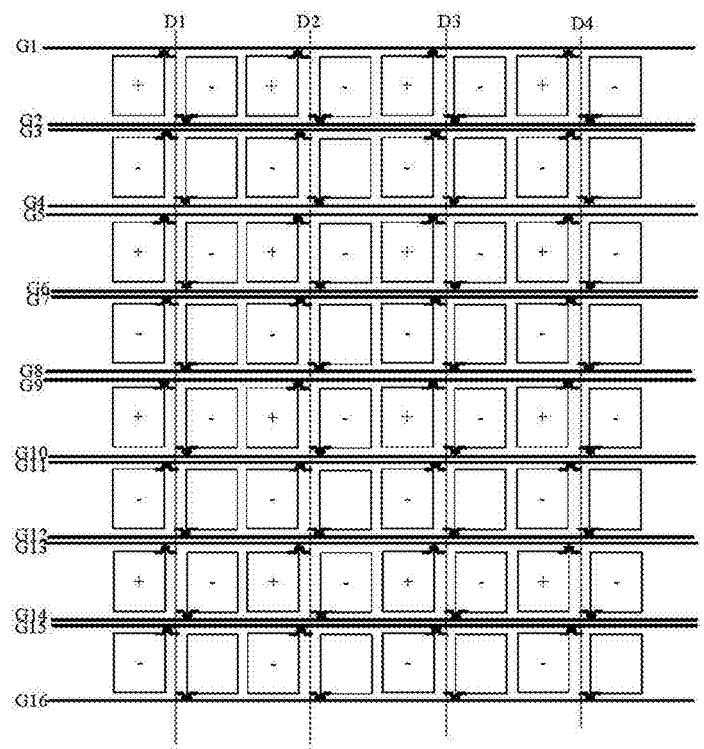
FIG. 10 is a diagram of a part of pixel polarities at the time of driving the display device according to the seventh embodiment in accordance with the driving method of the ninth embodiment of the present disclosure under the timing shown in FIG. 6.

Also as shown in FIG. 10, after the gate lines corresponding to the third clock signal of each of the GOA units are turned on, the pixels which are on an odd column and on an even row are driven, and the voltage polarity of the pixels on the odd column and on the even row is negative (in the drawing, denoted with a symbol of "−").

Thus, it can be known that, the polarity of the voltage outputted from the data line in the third field is same as that of the second field, which is equivalent to that in this case, the time during which the polarity of the voltage outputted from the data line remains unchanged is a frame period of (2/N).

Figure 7:
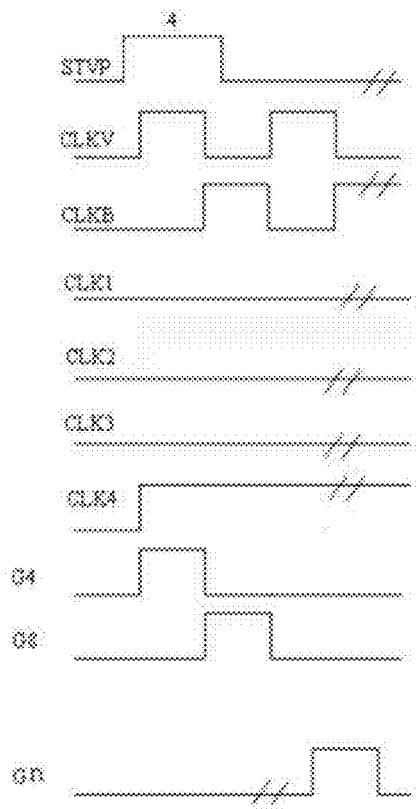
FIG. 7 is a timing chart of respective signals of a fourth field of the polarity inversion driving method according to the embodiment of the present disclosure.

During a fourth ¼ frame period, that is, a fourth field, the STVP signal is represented with 4 of FIG. 7, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G4, G8 . . . Gn, where n is the number of the gate lines; turn-on timing chart of the turn-on gate lines is as shown in the drawing; in this case, only the fourth clock signal CLK4 in each of the GOA units is at the high level, that is, the gate lines G4, G8 . . . Gn corresponding to the fourth clock signal are turned on.

Figure 11:
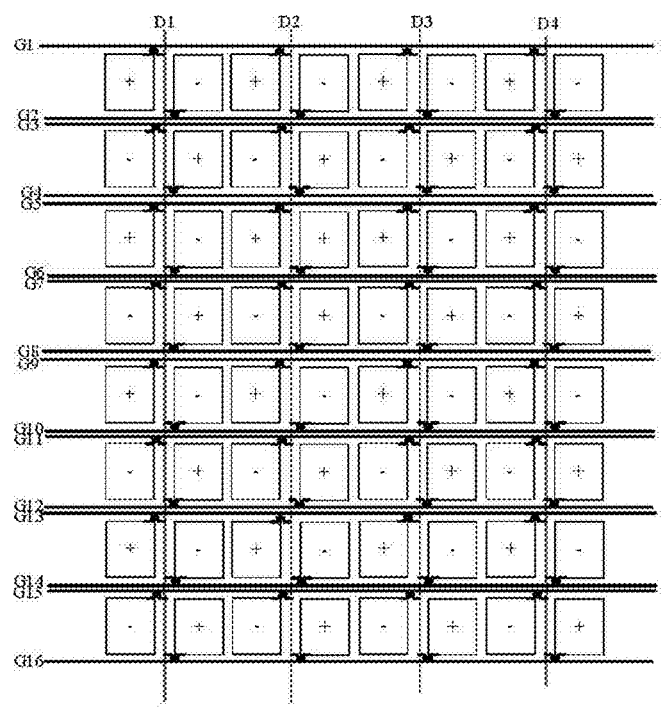
FIG. 11 is a diagram of a part of pixel polarities at the time of driving the display device according to the seventh embodiment in accordance with the driving method of the ninth embodiment of the present disclosure under the timing shown in FIG. 7.

Also as shown in FIG. 11, after the gate lines corresponding to the fourth clock signal of each of the GOA units are turned on, the pixels on an even row and on an even column are driven, and the voltage polarity of the pixels on the even row and on the even column is positive (in the drawing, denoted with a symbol of "+").

Therefore, as compare with the third field, in the fourth field, the polarities of the voltages outputted from all of the data lines are changed; in this case, the polarity inversion period of the voltage outputted from the data lines is (1/N) of a frame period.

To sum up, as compared with the conventional single dot driving method, in the driving method of the display device of the present embodiment, the period of the polarity inversion of the voltage outputted from data lines is greatly increased, so that the inversion frequency of the voltage outputted from data lines is greatly reduced, and thus the power consumption is reduced; and since it is the single dot driving, a good display effect can be ensured.

Tenth Embodiment

The present disclosure provides a single dot polarity inversion driving method based on the GOA circuit of the embodiments of the present disclosure, and each of the GOA units of the GOA circuit is connected to four gate lines; the detail thereof is as follows.

During a first ¼ frame period, that is, a first field, the STVP signal is represented with 1 of FIG. 4, and correspondingly, a first source signal is denoted with CLKV; a second source signal is denoted with CLKB; a first clock signal is denoted with CLK1; a second clock signal is denoted with CLK2; a third clock signal is denoted with CLK3; a fourth clock signal is denoted with CLK4; and gate lines that are sequentially turned on are denoted with G1, G5 . . . Gn-3 respectively, where n is the number of the gate lines; turn-on timing chart of the turn-on gate lines is as shown in the drawing; in this case, only the first clock signal CLK1 in each of the GOA units is at the high level, that is, the gate lines G1, G5 . . . Gn-3 corresponding to the first clock signal are turned on.

Figure 12:
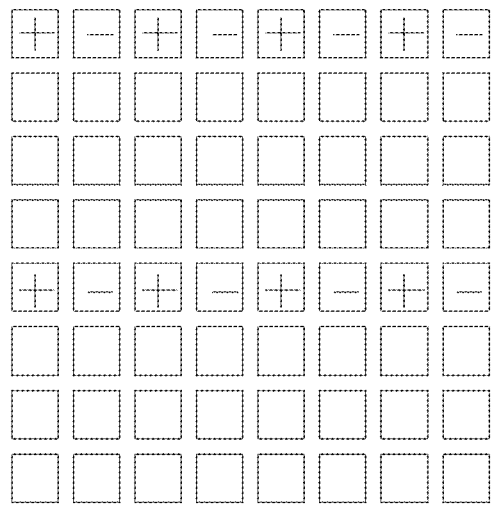
FIG. 12 is a diagram of a part of pixel polarities at the time of driving the display device according to the eighth embodiment in accordance with the driving method of the tenth embodiment of the present disclosure under the timing shown in FIG. 4.

Also as shown in FIG. 12, after the gate lines corresponding to the first clock signal of each of the GOA units are turned on, the voltage polarities of the pixels on all of the odd columns in the pixel rows corresponding to turn-on gate lines are positive (in the drawing, denoted with a symbol of "+"), and polarities of the voltages of the corresponding data lines for driving the pixels on the odd columns are positive; the voltage polarities of the pixels on all of the even columns in the pixel rows corresponding to turn-on gate lines are negative (in the drawing, denoted with a symbol of "−"), and polarities of the voltages of the corresponding data lines for driving the pixels on the even columns are negative.

During a second ¼ frame period, that is, a second field, the STVP signal is represented with 2 of FIG. 5, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G2, G6 . . . Gn-2 respectively, where n is the number of the gate lines; turn-on timing chart of the turn-on gate lines is as shown in the drawing; in this case, only the second clock signal CLK2 in each of the GOA units is at the high level, that is, the gate lines G2, G6 . . . Gn-2 corresponding to the second clock signal are turned on.

Figure 13:
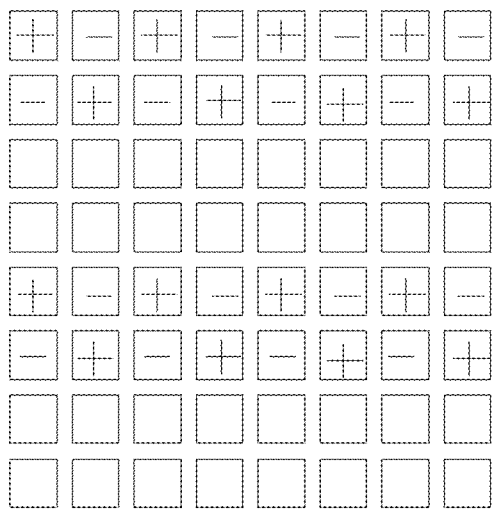
FIG. 13 is a diagram of a part of pixel polarities at the time of driving the display device according to the eighth embodiment in accordance with a driving method of a tenth embodiment of the present disclosure under the timing shown in FIG. 5.

Also as shown in FIG. 13, after the gate lines corresponding to the second clock signal of each of the GOA units are turned on, the voltage polarities of the pixels on all of the even columns in the pixel rows corresponding to turn-on gate lines are positive (in the drawing, denoted with a symbol of "+"), and polarities of the voltages of the corresponding data lines for driving the pixels on the even columns are positive; the voltage polarities of the pixels on the odd columns in the pixel rows corresponding to turn-on gate lines are negative (in the drawing, denoted with a symbol of "−"), and polarities of the voltages of the corresponding data lines for driving the pixels on the odd columns are also negative.

During a third ¼ frame period, that is, a third field, the STVP signal is represented with 3 of FIG. 6, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G3, G7 . . . Gn-1, where n is the number of the gate lines; turn-on timing chart of the turn-on gate lines is as shown in the drawing; in this case, only the third clock signal CLK3 in each of the GOA units is at the high level, that is, the gate lines G3, G7 . . . Gn-1 corresponding to the third clock signal are turned on.

Figure 14:
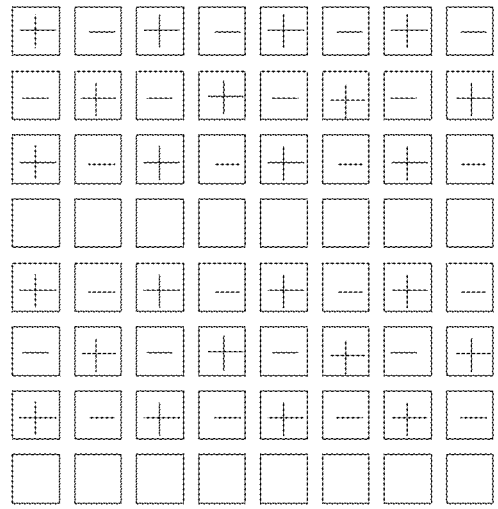
FIG. 14 is a diagram of a part of pixel polarities at the time of driving the display device according to the eighth embodiment in accordance with the driving method of the tenth embodiment of the present disclosure under the timing shown in FIG. 6.
Figure 15:
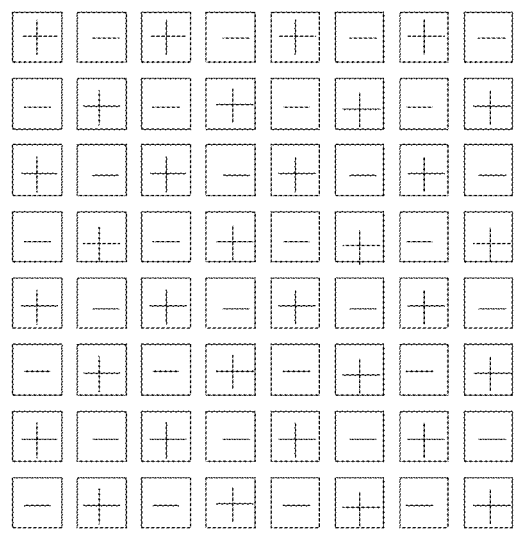
FIG. 15 is a diagram of a part of pixel polarities at the time of driving the display device according to the eighth embodiment in accordance with the driving method of the tenth embodiment of the present disclosure under the timing shown in FIG. 7.

Also as shown in FIG. 14, after the gate lines corresponding to the third clock signal of each of the GOA units are turned on, the voltage polarities of the pixels on the odd columns in the pixel rows corresponding to turn-on gate lines are positive (in the drawing, denoted with a symbol of "+"), and polarities of the voltages of the corresponding data lines for driving the pixels on the odd columns are positive; the voltage polarities of the pixels on the even columns in the pixel rows corresponding to the turn-on gate lines are negative (in the drawing, denoted with a symbol of "−"), and polarities of the voltages of the corresponding data lines for driving the pixels on the even columns are also negative.

During a fourth ¼ frame period, that is, a fourth field, the STVP signal is represented with 4 of FIG. 7, and correspondingly, the first source signal is denoted with CLKV; the second source signal is denoted with CLKB; the first clock signal is denoted with CLK1; the second clock signal is denoted with CLK2; the third clock signal is denoted with CLK3; the fourth clock signal is denoted with CLK4; and turn-on gate lines are denoted with G4, G8 . . . Gn, where n is the number of the gate lines; turn-on timing chart of the turn-on gate lines is as shown in the drawing; in this case, only the fourth clock signal CLK4 in each of the GOA units is at the high level, that is, the gate lines G4, G8 . . . Gn corresponding to the fourth clock signal are turned on.

Also as shown in FIG. 14, after the gate lines corresponding to the fourth clock signal of each of the GOA units are turned on, the voltage polarities of the pixels on the even columns in the pixel rows corresponding to turn-on gate lines are positive (in the drawing, denoted with a symbol of "+"), and polarities of the voltages of the corresponding data lines for driving the pixels on the even columns are positive; the voltage polarities of the pixels on the odd columns in the pixel rows corresponding to turn-on gate lines are negative (in the drawing, denoted with a symbol of "−"), and polarities of the voltages of the corresponding data lines for driving the pixels on the odd columns are also negative.

Here, in a specific implementation, it is possible to shift by changing the start dot of the period of the clocks CLK1 to CLK4, and then the turn-on gate lines will be different; the polarity of the voltage of the data lines can start from positive or negative, as long as the requirement for the dot polarity inversion is satisfied.

The polarity inversion driving method of the present disclosure inherits a favorable driving effect of the conventional single dot polarity inversion driving method, and as compared with the conventional dot polarity inversion driving method, the polarity inversion period of the voltage of a data line is extended to a period of (¼) frame; the inversion frequency of the voltage outputted from the data line is low, and thus the power consumption is greatly reduced.

The above implementations are only to illustrate the embodiments of the present disclosure, and are not to limit the present disclosure. Those skilled in the art can further make various changes and variations without departing from the spirit and the scope of the embodiments of the present disclosure; therefore, all the equivalent technical solutions also fall into the scope of the present disclosure, and the patent protection scope of the present disclosure should be defined by the claims.

What is claimed is:

1. A driving method for a display device comprising a pixel array and a GOA circuit, wherein each row of the pixels is configured to correspond to two gate lines, the pixels located in odd columns are connected to one of the two gate lines, and the pixels located in even columns are connected to the other of the two gate lines, and the pixels on $(2i+1)^{th}$ column and pixels on $2(i+1)^{th}$ column are configured to share one data line, where i is an integer equal to or larger than zero; the GOA circuit comprises at least two GOA units connected in cascade each being connected to adjacent N gate lines and configured to sequentially turn on the N gate lines connected thereto;

the driving method comprising:
dividing each image frame into N fields for display;
during a period of each field, turning on one gate line by each GOA unit under a control of a corresponding clock signal;
during each field period, maintaining polarities of voltages outputted from all of the data lines identical;
wherein polarities of voltages outputted from data lines during a $(4S+1)^{th}$ field are opposite to those in a $(4S+2)^{th}$ field;
polarities of voltages outputted from data lines during the $(4S+2)^{th}$ field are identical to those in a $(4S+3)^{th}$ field;
polarities of voltages outputted from data lines during the $(4S+3)^{th}$ field are opposite to those in a $(4S+4)^{th}$ field;
wherein, S is an integer equal to or larger than zero, and value of (4S+4) is less than or equal to N; and
N represents the number of clock signals imported to the GOA circuit, and is a multiple of 4.

2. A driving method for a display device comprising a pixel array and GOA circuit, wherein each row of the pixels is connected to one gate line and each column of the pixels is connected to one data line; the GOA circuit comprises at least two GOA units connected in cascade each being connected to adjacent N gate lines and configured to sequentially turn on the N gate lines connected thereto;

the driving method comprising:
dividing each image frame into N fields for display to achieve a single dot polarity inversion;
during a period of each field, turning on one gate line by each GOA unit under a control of a corresponding clock signal;
wherein a period of polarity inversion of a voltage outputted from each of data lines is equal to the period of each field, and polarities of voltages outputted from two adjacent data lines are opposite to each other,
wherein N represents the number of clock signals imported into the GOA circuit.

* * * * *